Feb. 15, 1938. W. J. BARMAN 2,108,159
AIR CONDUIT
Filed July 6, 1937

Inventor.
W. J. Barman
By Hazard and Miller
Attorneys.

Patented Feb. 15, 1938

2,108,159

UNITED STATES PATENT OFFICE 2,108,159

AIR CONDUIT

Waldemar J. Barman, Los Angeles, Calif.

Application July 6, 1937, Serial No. 152,228

8 Claims. (Cl. 138—63)

It is quite common practice to use air ducts formed of various angular shapes for transmission of hot air for heating purposes, conditioned air, and cooled air for air conditioning buildings or for refrigeration. It has also been quite common to heat insulate the angular ducts with a covering of fibrous material such as mineral wool, so-called spun glass, asbestos fibers or the like, wrapped around the ducts or conduits. However many of such installations have been inefficient in that the heat insulating material is not properly held in place on the conduit, that the covering is not uniform and particularly at the corners tends to cut and separate sometimes leaving the corners of the conduit exposed. In addition when the conduits are covered with the mass or pads of fibrous material, such material collects dust and when the duct is used for transmitting refrigerated air, despite the insulation, moisture sometimes condenses on the outside of the pads.

An object and feature of my invention resides in part in providing corner protectors which also function as spacing elements secured in position outside of the insulating covering and in alignment with the corners of the duct. These protectors operate to hold the insulating pad in proper position at the corners and also form straight line corners over which a covering of fabric such as canvas, duck or the like, may be stretched and stitched. Such fabric may then be painted or otherwise treated to partly shrink the fabric and thus form a tight drum-like and well fitting covering. A further detail feature of my invention is the provision of corner angles formed of sheet metal or equivalent material having the corners project outwardly and the flanges bent laterally to conform somewhat to the shape of the insulating covering at the corners of the duct. These spacing corner angles are preferably somewhat bulbous at the angle and have the fabric cover stretched from corner to corner. In order to secure the angles and the fabric covering, this covering is preferably bound in place by a helical winding of wire or wire rings bound around the outside of the fibrous insulation. Then the angles may be secured to the wire wrapping by short pieces of twisted wire engaging through perforations in the flanges of the angle and attached to the wrapping wire. Another characteristic of my invention resides in forming air spaces inside of the fabric covering and between such covering and the corner angles and the insulating pad on each side of the duct between the corners, thus adding to the heat insulating characteristics of a duct covered in accordance with my invention. In addition the fabric covering, especially after being suitably painted, presents smooth surfaces to which dust does not readily adhere and on upper horizontal surfaces dust may readily be removed should it accumulate. In addition, under conditions of the duct transmitting cold air, there is but little condensation of moisture on the outside of the fabric and if in extreme cases the moisture should collect, instead of soaking the insulating pad such moisture readily runs off the fabric cover.

My invention is illustrated in connection with the accompanying drawing, in which.

Figure 1:
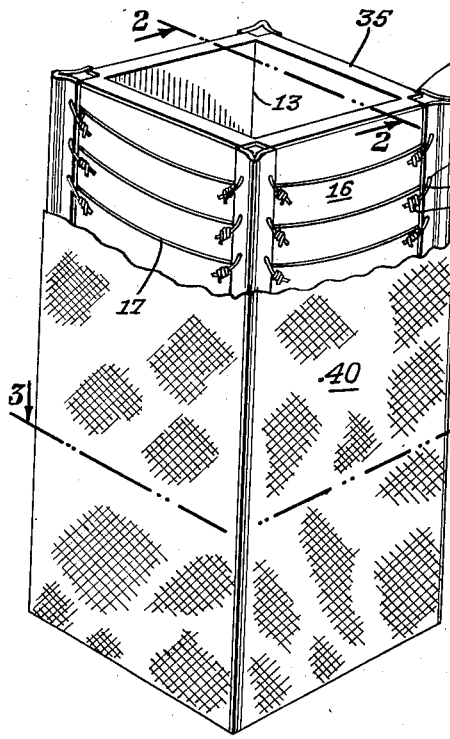
Fig. 1 is a perspective view of part of an angular shaped duct showing the manner of securing the fibrous insulating cover, the angles and the fabric outside covering.
Figure 2:
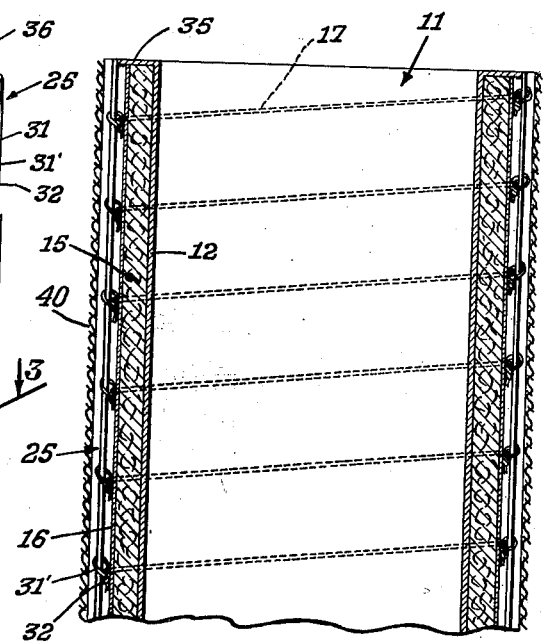
Fig. 2 is a longitudinal section and may be considered as taken on the longitudinal section line 2—2 of Fig. 1 in the direction of the arrows.
Figure 3:
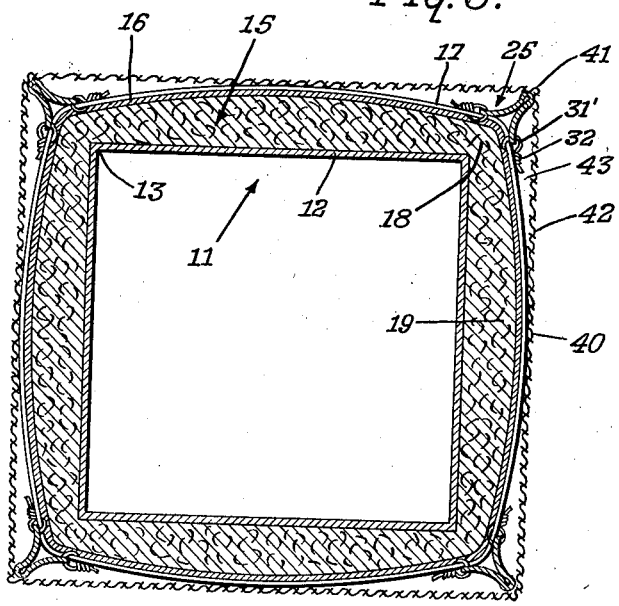
Fig. 3 is a transverse section and may be considered as taken on the section line 3—3 of Fig. 1 in the direction of the arrows.
Figure 4:
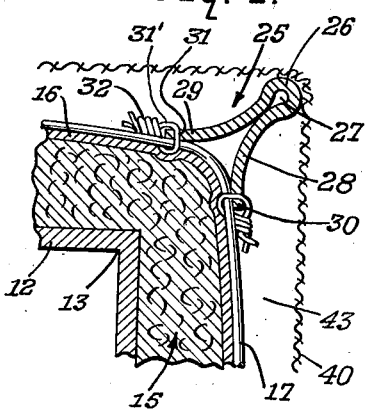
Fig. 4 is an enlarged sectional view of one of the corners of Fig. 3.

In the illustration a duct is indicated by the numeral 11. This is usually made of galvanized iron and may be considered as having four sides 12, and angular corners 13. While the illustration shows the duct as square in cross section, these are frequently made in other rectangular shapes in accordance with the conditions for installation. Also the ducts are sometimes made with more than four angles. The heat insulating pad or covering 15 illustrated as of fibrous material such as mineral wool has an outside protecting cover 16 usually of water proof paper. Such pads are usually received from the manufacturer made up in long lengths or rolls and of various specified widths in which the fibrous insulating material and the paper covering adhere one to the other or sometimes the fibrous material is attached to the paper by glue or cement. Thus the pad with the paper may be lapped around the duct usually with a slight overlap at the joint. The fibrous covering with the paper is then secured in place by a wrapping of wire 17. This may be a long wire wrapped in a helical manner with the adjacent loops of the wire approximately the same distance apart. However, sometimes the wire wrapping is made in the form of individual loops with the ends twisted together. This causes the insulating packing to be somewhat compressed outside of the corners as indicated at 18 and permits some bulge as indicated at 19 between the corners. The wrapping of wire is not made sufficiently tight to press the paper covering 16 into the corners 13 of the duct and hence as the wire has a certain amount of slackness, it bows outwardly between the corners permitting the bulge or thicker sections of the fibrous insulation.

After a duct has been covered with the fibrous heat insulating material as above described, protecting and spacing corner angles 25 are positioned outside and in alignment with each corner of the duct. These are preferably formed of sheet metal with a reverse corner bend 26 formed somewhat bulbous, this leaving a slight space 27 immediately inside the corner which may if desired, have a wire extending longitudinally. There are diverging flanges 28, these preferably having a concave bend outwardly as indicated at 29 and have the edge parts 30 diverging. The divergence is made to conform somewhat to the corners 13 but even when such corners are a right angle, it is preferable to have the angle between the end parts 30 forming an acute angle slightly less than a right angle. Each flange of an angle has a series of perforations 31 spaced along its length and a binding wire 31' is fitted in each perforation and around an adjacent section of the wrapping wire 17 and secured by a twist indicated at 32 or in other suitable manner. By this construction the angles 25 are securely attached to the wrapping of the fibrous heat insulation and held directly with the corners 13 and the reverse bend 26 of the angles in alignment.

Usually the ducts are made up in definite lengths, each length having outwardly turned flanges 35 and adjacent duct section secured together at such flanges. In this case the angles 25 have their flanges engaging the flanges of the duct as indicated at 36. It may be necessary to bend the flanges 28 and the marginal edges 30 slightly outwardly to conform to the right angle of adjacent flanges 35. Such flanges therefore also are operative to hold the angles 25 at a fixed distance from the corners 13.

A fabric outside cover 40 is stretched over the angles 25, such fabric having corners 41 and webs 42 extending between contiguous corners. Each web forms a plane, the fabric cover is usually stitched with a concealed sailmaker's stitching, the fabric being stretched to form a reasonably tight cover. The angles 25 should be so positioned that the bulge 19 does not press the web of the fabric outwardly. However the tightly stretched fabric is operative to limit the amount of the bulge 19 of the fibrous heat insulating material. It will be seen therefore that there are a series of air spaces 43 inside of the fabric between the corner angles 25 and the paper wrapping 16 which increases the heat insulating characteristics of the covered conduits. This fabric may be coated with a suitable paint or so-called dope which has the characteristics of somewhat shrinking the fabric such as canvas or duck and therefore forms somewhat tight drum-like surfaces between the angles 25. Thus the completely covered duct has not only a neat appearance but has surfaces which do not readily accumulate dust or moisture.

Various changes may be made in the details of the construction without departing from the spirit or scope of the invention as defined by the appended claims.

I claim:

1. In a device as described, a duct for transmission of air or the like having angular corners and a covering of heat insulation combined with rigid angle devices secured outside of the insulating cover in alignment with the angular corners of the duct and an outside covering of fabric or the like stretched over said angle devices.

2. In a device as described, in which a duct having angular corners and adapted for transmission of air has a heat insulating covering of fibrous material combined with spacing elements each formed of a rigid angle member with diverging flanges, the flanges engaging the outside of the insulating covering with the angles in alignment with the corners of the duct and an outside covering of fabric or the like stretched over and between the various angles and enclosing the heat insulating covering.

3. In a device as described, in which a duct having angular corners adapted for transmission of air or the like has a heat insulating covering of fibrous material in contact with the sides of the duct and extending around the corners of such duct combined with a wire wrapping on the outside of the heat insulating material, a spacing device formed of an angle having diverging flanges positioned with the flanges engaging the outside of the covering and in alignment with each corner of the duct, means attaching each angle device to the wrapping wire and an outside covering of fabric or the like extending over the outside angle of each spacing device and stretched between adjacent spacing devices substantially parallel to the various sides of the duct, the said outside covering confining the heat insulating material and forming air spaces between the outside covering and the outside of the heat insulating material.

4. In a device as described, in which a duct formed of sheet material has a plurality of corners and a covering of fibrous heat insulating material extending completely around the duct and confined by a protective cover and combined with a wrapping of wire around such protecting cover, the wire binding the insulating material and the cover on the sides and the corners of the duct and spacing devices formed of angles with diverging flanges, the flanges contacting the wire and the protecting cover, means to secure the flanges to the wire and an outside cover of fabric or the like stretched over the outside of the said angles and forming substantially plane surfaces between adjacent angles, the said outside cover forming with the protecting covering a series of air spaces.

5. In a device as described and claimed in claim 4, the duct having transverse outwardly extending flanges, the corner angles engaging such flanges, the flanges of the duct being operative to space the corner flanges from the duct.

6. In a device as described in which a duct formed of sheet material has a series of flat surfaces and a plurality of corners, a covering of heat insulating material extending completely around the duct, a wrapping means securing the material to the duct, the material forming a thicker covering on the sides between the corners than at the corners, a spacing angle in alignment with each corner, each having a pair of diverging flanges positioned contiguous to the covering opposite a corner and an outside covering of fabric or the like stretched over the outside of the angles and forming substantially plane surfaces between adjacent angles and being positioned outside of the insulating covering.

7. In a device as described and claimed in claim 6, each spacing angle being formed of sheet material and having a reverse corner bend formed somewhat bulbous and with the flanges diverging, each with an inside convex curve and means to secure the flanges to the said wrapping means.

8. In a device as described, in which a duct formed of sheet material has a plurality of flat sides with connecting angular corners and outwardly turned flanges, a covering of insulating material on the flat surfaces and the outside of the corners, an angle positioned outside of each corner and having diverging flanges, the flanges of the angles engaging the flanges of the duct and an outside wrapping of fabric or the like stretched over the angles and forming substantially plane surfaces between adjacent angles.

WALDEMAR J. BARMAN.